Sept. 1, 1959     A. A. AUERBACH ET AL     2,902,686
SIGNAL APPARATUS
Filed Nov. 29, 1954     7 Sheets-Sheet 1

INVENTORS.
ALBERT A. AUERBACH
MORSE MINKOW
EDMUND D. SCHREINER
BY S.C. Yuter
ATTORNEY.

INVENTORS.
ALBERT A. AUERBACH
MORSE MINKOW
EDMUND D. SCHREINER
BY S.C. Yuter
ATTORNEY.

N PULSE GENERATOR 58

INVENTORS.
ALBERT A. AUERBACH
MORSE MINKOW
EDMUND D. SCHREINER

BY S.C. Yuter

ATTORNEY

INVENTORS.
ALBERT A. AUERBACH
MORSE MINKOW
EDMUND D. SCHREINER
BY
ATTORNEY.

Sept. 1, 1959     A. A. AUERBACH ET AL     2,902,686
SIGNAL APPARATUS

Filed Nov. 29, 1954     7 Sheets-Sheet 7

DELAY LINE 71

PULSE EXTENDER 250

INVENTORS.
ALBERT A. AUERBACH
MORSE MINKOW
EDMUND D. SCHREINER
BY
ATTORNEY

_United States Patent Office_

2,902,686
Patented Sept. 1, 1959

2,902,686

SIGNAL APPARATUS

Albert A. Auerbach, Hollis, Morse Minkow, Bronx, and Edmund D. Schreiner, Port Washington, N.Y., assignors to Underwood Corporation, New York, N.Y., a corporation of Delaware Application November 29, 1954, Serial No. 471,696

4 Claims. (Cl. 340—345)

This invention relates to signal generators and more particularly to generators of precisely timed signals.

An important application for precisely timed signals is found in data processing systems such as electronic digital computers which utilize these signals to select portions of information.

In numerous data processors information is stored as a plurality of characters and each of the characters is represented by a number of indicia. In certain of these data processors, both the indicia and the characters are stored in a predetermined time sequence and time is measured in respect to a basic timing cycle which characterizes the particular data processor involved.

If information is stored so that the characters are serially arranged, the characters may be identified as the first, second, or third character and so on in accordance with the position of the character in the sequence. The characters, however, can be more definitely identified by the time of their occurrence in relation to the basic timing cycle. For example, a character may be identified as the character which occurs at the midpoint of a basic timing cycle.

The indicia which represent characters can also be identified by their relative positions, i.e. first, second or third indicium. However the indicia are also more absolutely identified by their position in relation to a basic timing cycle.

For example, a data processor which stores information as groups of nine characters, each represented by four indicia, would ordinarily operate with a basic timing cycle of thirty-six sequential time positions which can be designated at $t1$ through $t36$. The thirty-six indicia are represented sequentially in the thirty-six time positions. The first character is represented in time positions $t1$ through $t4$; the second character is represented in time positions $t5$ through $t8$, and so on. The last character is represented in the time positions $t33$ through $t36$. Therefore, the first character can be identified as that character which occupies the time positions $t1$ to $t4$ and other characters can be similarly identified.

Further, the indicia which represent each character can be identified with reference to the basic timing cycle. For example, the first character may be represented by four indicia sequentially arranged in the time positions $t1$ through $t4$. The first indicium is represented in the time period designated $t1$; the second indicium is represented in the time period $t2$; the third indicium in $t3$; and the fourth indicium in $t4$. It is therefore possible to select a particular indicium from a given character by specifying its time position in accordance with the basic timing cycle.

In data processing applications it is frequently desirable to be able to single out particular characters or certain of the indicia which represent particular characters. This is ordinarily accomplished by feeding the characters of the information sequentially into a switching circuit which passes a portion of the information as controlled by a precisely-timed signal. It is therefore extremely convenient to provide a source of precisely-timed signals which are capable of controlling the passing of selected indicia or characters through a switching circuit.

It is accordingly an object of the invention to provide an improved generator of precisely timed signals.

A further object of the invention is to provide a source of precisely-timed signals which can be used for selecting characters and indicia from a unit of information.

A further object of the invention is to provide convenient and reliable means for the selection of predetermined portions of information.

A signal generator in accordance with the preferred embodiment of the invention comprises a first generator for supplying a sequence of precisely timed pulses which are identifiable in the sequence. Each signal has a time duration which permits the selection of individual indicium. A second generator is provided which is responsive to the pulses produced by the first generator for supplying a sequence of pulses of longer duration for selecting characters or a plurality of indicia. These latter pulses are also precisely timed and identifiable in the sequence.

In the past, precisely-timed signals were supplied by a storage device which consists of a series of delay lines each having a precisely-determined delay. A signal is inserted into the storage loop and passes through the series of delay lines which provide the precisely-timed signals.

A disadvantage of a storage device which consists of delay lines is that the processed signals are noticeably attenuated in the delay lines and require amplification and reshaping. Further, delay lines are expensive circuit components.

Another object of the invention is, therefore, to provide improved delay apparatus.

A further object of the invention is to provide a storage device which does not require the use of delay lines.

Still another object of the invention is to provide delay apparatus in which signals are not attenuated.

Briefly, in accordance with a feature of the invention, delay apparatus is provided which comprises first means to receive an input signal and second means responsive to the input signal and a timing signal to initiate a delayed output signal. The first and second means are regeneratively coupled to provide a delayed output signal which has been reshaped.

An advantage of this feature of the invention is that delay means are provided which generate signals at a high power level and therefore signals can be provided for loads which draw large amounts of current.

A further advantage of this feature is that the output signals can be reshaped as desired.

The invention will be more readily understood from the following description taken together with the accompanying drawings in which.

Figure 15:
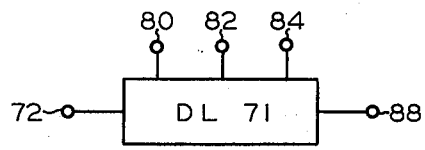
Fig. 15 shows the logical symbol for a delay line.
Figure 16:
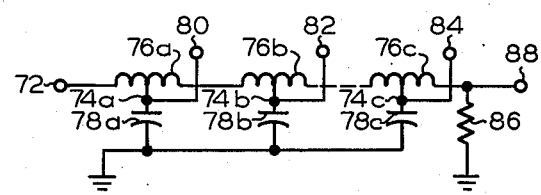

Fig. 16 schematically illustrates a circuit represented by the symbol of Fig. 15.

Figure 17:
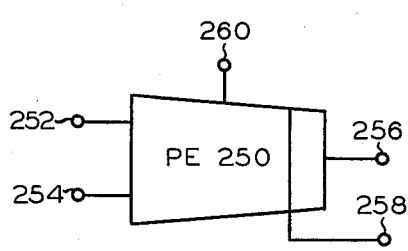

Fig. 17 shows the logical symbol for a pulse extender.

Figure 18:
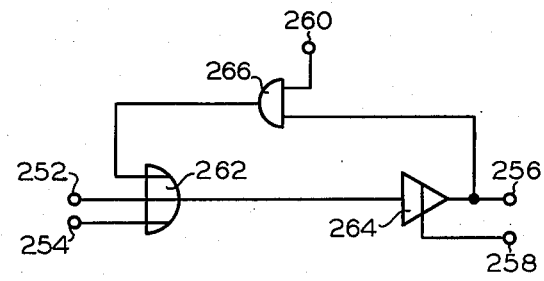

Fig. 18 is the logical diagram of the circuit represented by the symbol of Fig. 17.

A signal generator in accordance with the preferred embodiment of the invention will be discussed with reference to a particular electronic digital computer for convenience of explanation. The computer handles information in units of nine characters. Each character is encoded in the binary system and is represented by four binary digits. Thus, a unit of information in this computer consists of thirty-six binary digits. The binary system employs the binary digits one and zero.

The computer operates on a basic timing cycle in accordance with the number of binary digits in a unit of information. Therefore the basic timing cycle of the computer consists of thirty-six time positions. A unit of information may be carried in phase with the basic timing cycle in the computer or the unit of information may be delayed with respect to the basic timing cycle. For example, if the unit of information is in phase with the basic timing cycle, the first binary digit of the unit of information will be represented during the first time period of the basic timing cycle, the second binary digit will be represented during the second time period, etc. When the unit of information is delayed with respect to the basic timing cycle, the binary digits will be represented in time periods in accordance with the amount of delay.

The signal generator disclosed herein can be used to provide accurately timed pulses corresponding to each quarter pulse time period of each binary digit and such pulses can be utilized for control of digit switching and like functions in a computer. The generator has a recirculating loop of serially connected pulse reshapers only, and since each reshaper has an inherent delay of one-quarter of a pulse length, output pulses of perfect shape and substantial power are available at quarter pulse intervals. The total recirculation loop is designed to have a delay equal to four pulses so the output of each reshaper comprises a series of pulses at four pulse period intervals. A second recirculation loop of flip-flops or pulse extenders is controlled by the first loop pulses and a control pulse source to provide a number of four pulse length signals at overlapping intervals, the total repetition time being equal to the length of a word in the computer. By suitable combination of the pulses in the two loops, output pulses for timing are available from the signal generator at one-quarter pulse intervals for the duration of the entire computer word.

Because characters in the associated computer are not necessarily in phase with the basic timing cycle signals that correspond to characters will not be shown as occurring in perfect sequence.

In the computer, the binary digits one and zero are represented by the presence or absence of a pulse respectively. Only one pulse can occur in the time length of a time period and, hence, the time length may hereinafter be designated as a pulse period or pulse time. A pulse period may be displaced in time from a time period.

The pulses are square-wave pulses having a fifty percent duty cycle. Thus a pulse which is present occurs during one half of a pulse period and is absent during the second half of the pulse period. If a pulse is absent, it is absent during the entire pulse period.

The computer handles signals which are generally of only two voltage levels. The absence of a pulse is represented by minus ten volts and the presence of a pulse is represented by plus five volts. Thus, during a pulse period in which a pulse is present, the potential level during the first half of the pulse period is plus five volts and the potential level during the second half of the pulse period is minus ten volts. If a pulse is absent during a pulse period, the potential level during the entire pulse period is minus ten volts.

The time periods in a basic timing cycle will be designated $Tn$ and include the time periods T1–T36. The time periods of the basic timing cycle can be further broken down into one-quarter time periods. For example, a pulse period can be initiated at T5-2/4 and terminated at T6-2/4. A signal which is to correspond to a character may be initiated at T27-1/4 and terminated at T31-1/4.

Figure 1:
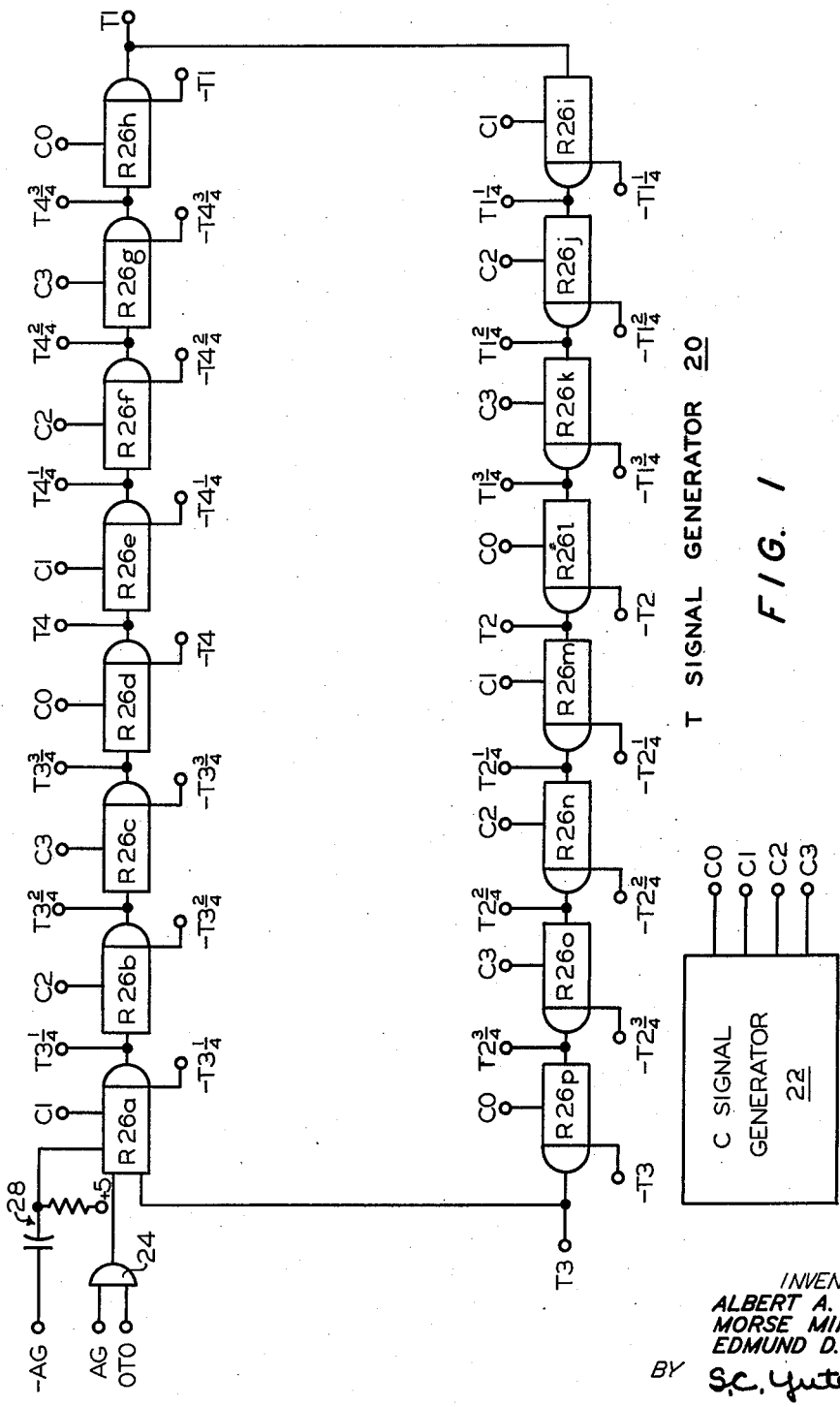
Fig. 1 is a block diagram (employing logical symbols) of a generator which supplies precisely-timed pulses which are utilized to identify individual indicium in accordance with the preferred embodiment of the invention.

Referring now to the T signal generator 20 shown in Fig. 1, a circuit is logically represented which generates pulses corresponding in time length to pulse and time periods. The T signal generator 20 comprises the C signal generator 22, the gate 24, the reshapers 26a–26p and the differentiating network 28.

Figure 3:
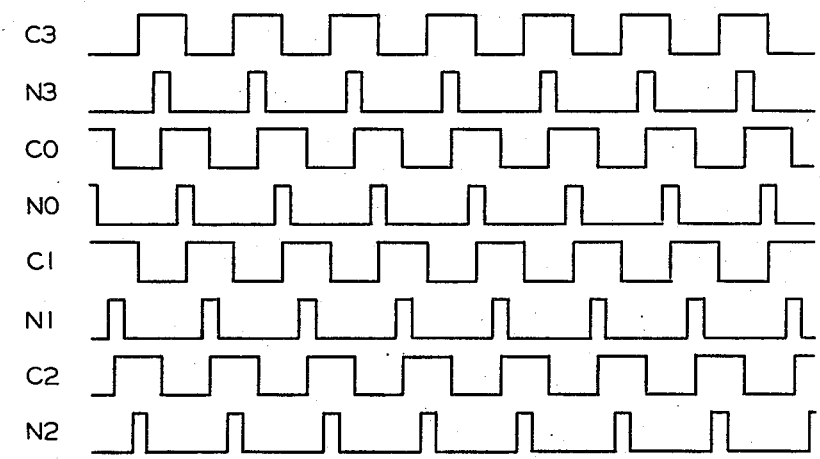
Fig. 3 is a time chart of certain of the signals which occur in the generators shown in Figs. 1 and 2.

The C signal generator 22 generates a series of clock pulses C0, C1, C2 and C3 such that C1 lags a quarter of a pulse period behind C0, C2 lags a quarter of a period behind C1 and C3 lags a quarter of a pulse period behind C2. The clock pulses will hereinafter be shown with greater particularity. The details of the C signal generator 22 are described and claimed in the co-pending application of Samuel Lubkin, Serial No. 245,947, filed September 10, 1951, now Patent No. 2,756,329 dated July 24, 1956, and assigned to the same assignee. In the co-pending application, the details of the C signal generator 22 are illustrated in Fig. 3 wherein the appropriate output terminals are labeled C0, C1, C2 and C3.

The signals generated by the C signal generator 22 are transmitted to the reshapers 26a–26p but are not directly shown as being coupled to the reshapers 26 in order to simplify the drawing.

Gate 24 is a coincidence-type gate and comprises a crystal diode network which functions to receive input signals via its input terminals and to pass the most negative signal.

The gate 24 has two input terminals and, if minus ten volts is present at either of the input terminals, the gate 24 transmits minus ten volts. If positive signals are present at both of the input terminals the gate 24 functions to pass plus five volts. The gate 24 is hereinafter explained in greater detail.

The reshapers 26 are electronic circuits which function to reshape and retime positive input pulses.

It will be noted, for example, that the gate 24 transmits a signal to an input terminal of the reshaper 26a. The reshaper 26a also receives a pulse C1 via a timing terminal which is illustrated as the C1 terminal. At the earliest coincidence of an input pulse received by a reshaper and a clock pulse received via the reshaper's timing terminal, the reshaper initiates an output pulse. The output pulse is terminated when the clock pulse terminates at the timing terminal.

In the description which follows, the clock pulses are timed to occur one-quarter of a pulse period after the initiation of an input pulse. Therefore, an output pulse is initiated one-quarter of a pulse period after the input pulse is received by a reshaper and the input pulse is effectively delayed for one-quarter of a pulse period.

The reshapers have both positive and negative output terminals. For example, the positive output terminal of the reshaper 26a is designated T3-1/4 and the negative output terminal is designated —T3-1/4. When an output pulse is transmitted from a reshaper, the potential at the positive output terminal rises to plus five volts for the first half of the pulse period and returns to minus ten volts the last half of the pulse period. The potential of the negative output terminal is directly opposite that of the positive output terminal, and thus, when a pulse is transmitted from a reshaper, the potential at the negative output terminal for the first half of the pulse period is minus ten volts and the potential during the last half of the pulse period is plus five volts.

When no pulse is being transmitted by a reshaper, the voltage at the positive output terminal is minus ten volts and at the negative output terminal is plus five volts. The circuits of the reshapers will hereinafter be described in greater detail.

Gate 24 receives signals AG and OTO via its input terminals and is connected so as to transmit an output signal to reshaper 26a. Reshaper 26a receives signal —AG via differentiating network 28 at a "blocking" terminal and receives C1 via timing terminal C1. Reshaper 26a transmits output signals via positive output terminal T3-1/4 and negative output terminal —T3-1/4.

Reshaper 26b receives an input signal from positive output terminal T3-1/4 and signal C2 via timing terminal C2. Reshaper 26b transmits output signals via positive output terminal T3-2/4 and negative output terminal —T3-2/4.

Input terminal of reshaper 26c is coupled to positive output terminal T3-2/4 and the timing terminal of reshaper 26c is coupled to terminal C3 of C signal generator 22.

In like fashion, the remaining reshapers 26d–26p are serially connected and receive pulses from the C signal generator 22 as designated at the respective timing terminals.

The positive output terminal T3 of reshaper 26p is coupled to an input terminal of the reshaper 26a thereby forming a closed recirculation loop so that the generation of signals by the T signal generator 20 is a continuous function as will hereinafter be described in greater detail.

Figure 2:
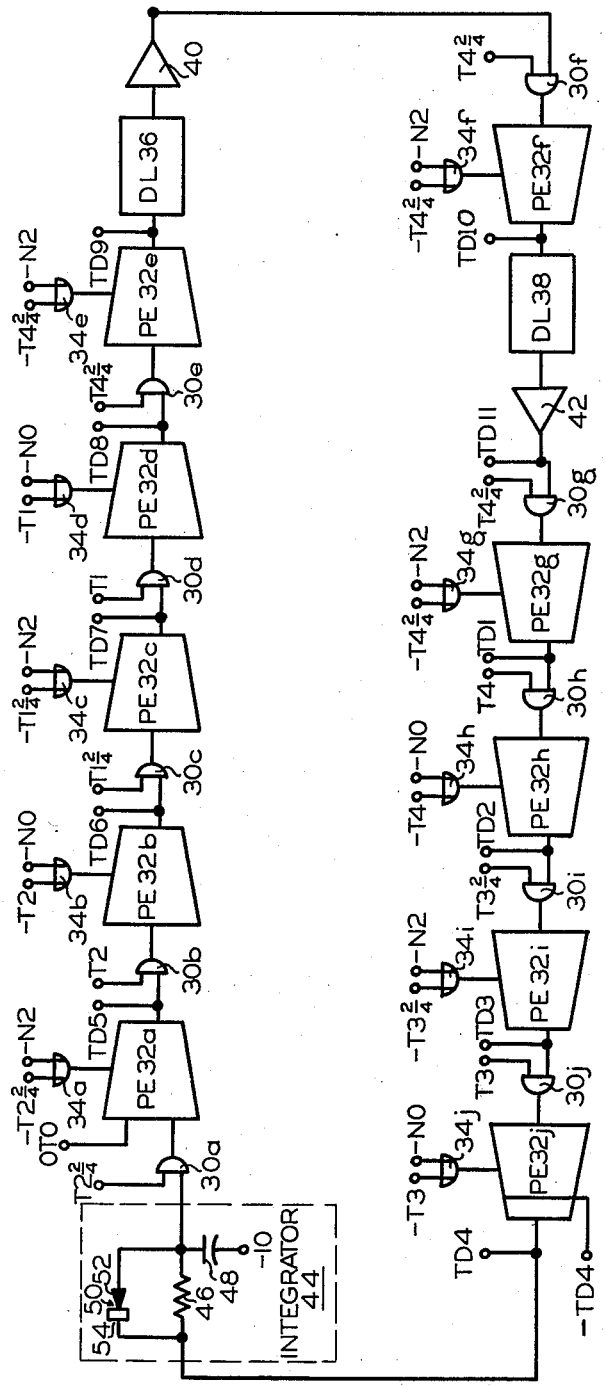
Fig. 2 is a block diagram (using logical symbols) of a generator which supplies signals which are employed to identify characters in accordance with the preferred embodiment of the invention.

Referring now to the TD signal generator 29 shown in Fig. 2, a circuit is logically represented which generates pulses corresponding in time duration to characters of the information in the computer.

The TD signal generator 29 comprises the gates 30a–30j, the pulse extenders 32a–32j, the buffers 34a–34j, the delay lines 36 and 38, the pulse amplifiers 40 and 42 and the integrator 44.

The gates 30a–30j are similar to the gate 24 and function to pass a positive signal only when positive signals are present at their respective input terminals.

The pulse extenders 32 are electronic circuits which function to produce output signals when excited by signals received via their respective input terminals. The output signal is initiated when an input signal is received via an input terminal and is terminated when a signal is received via a reset terminal. The pulse extenders will hereinafter be described in greater detail.

The reset terminals of the pulse extenders 32 are associated with the respective ones of the buffers 34a–34j. Output signals are transmitted from the pulse extenders 32 via terminals TDn.

The buffers 34a–34j are "or" gates comprising crystal diode networks which function to receive input signals via input terminals and to pass the most positive signal. Therefore if plus five volts is present at any of the input terminals of the buffer, the buffer transmits plus five volts. If, however, negative signals are present at all of the input terminals of a buffer the buffer transmits minus ten volts. The buffers 34a–34j will hereinafter be described in detail.

The delay lines 36 and 38 are lumped-parameter delay lines which function to delay pulses for discrete periods of time. The delay line 36 provides a delay of two pulse periods and the delay line 38 provides a delay to three-quarters of a pulse period. The delay lines 36 and 38 are provided in accordance with particular requirements of the computer and are not deemed essential to the invention. Delay lines 36 and 38 will hereinafter be described in detail.

Pulse amplifiers 40 and 42 will hereinafter be described in detail. Functionally, pulse amplifiers 40 and 42 are sources of power and transmit without logical change positive pulses which are received.

Integrator 44 comprises a resistor 46, a capacitor 48 and a crystal diode 50 having an anode 52 and a cathode 54. The integrator 44 is shown by way of illustration only to indicate what can be done to supply a small delay between successive pulse extenders if such delay is desired.

The resistor 46 of integrator 44 couples positive output terminal TD4 of pulse extender 32j to an input terminal of gate 30a. The junction of resistor 44 and gate 30a is connected via capacitor 48 to a minus ten volts supply. The crystal diode 50 is connected in parallel to resistor 46 with anode 52 being connected to the input terminal of gate 30a and cathode 54 being connected to positive output terminal TD4 of pulse extender 32j.

Crystal diode 50 acts as an open circuit when a positive signal is transmitted from positive output terminal TD4 and, under such circumstances, integrator 44 functions as a normal integrating circuit. When a negative signal is present at positive output terminal TD4, crystal diode 50 functions to short-circuit the resistor 46 thereby preventing resistor 46 from interfering with the operation of the crystal diode network of the gate 30a. Integrator 44 performs no logical function and is illustrated as a purely practical consideration for insuring that two pulse extenders cannot be excited simultaneously.

The input terminals of the gate 30a receive the signal T2-2/4 from the T signal generator 20 and the signal passed by integrator 44. The gate 30a transmits its output signal to an input terminal of pulse extender 32a. Another input terminal of the pulse extender 32a receives a signal OTO. The reset terminal of pulse extender 32a is coupled by the buffer 34a to signals —T2-2/4 and —N2. Pulse extender 32a transmits an output signal via positive output terminal TD5.

Gate 30b couples positive output terminal TD5 to the input terminal of pulse extender 32b. Gate 30b also receives signal T2. The reset terminal of pulse extender 32b is coupled via buffer 34b to signals —T2 and —N0. Pulse extender 32b transmits an output signal via positive output terminal TD6.

In a like manner the pulse extenders 32c–32j are serially connected and receive reset signals via their respective buffers 34. The associated gates 30 receive a signal Tn which, when coincident with a positive signal from the preceding pulse extender 32, excites the pulse extender 32 to whose input terminal the gate is coupled. The signals fed to the input terminals of buffers 34 function, when both are negative, to terminate the output pulses produced by pulse extenders 32.

Pulse extender 32j is coupled via the integrator 44 to gate 30a to form a closed circulation loop so that the production of pulses at output terminals TDn is a continuous function. It should be further noted that pulse extender 32e is coupled to the input terminal of gate 30f via the delay line 36 and the pulse amplifier 40 in series. Delay line 36 functions to delay the output signal of the pulse extender 32e for two pulse periods and the pulse amplifier 40 functions as a source of power. Similarly, pulse extender 32f is coupled via the delay line 38 and pulse amplifier 42, in series, to an input terminal of gate 30g. Delay line 38 functions to delay the output signal of pulse extender 32f for three-quarters of a pulse period and pulse amplifier 42 functions to supply power.

Referring now to the time chart shown in Fig. 3, the phase relationship of the C pulses used in the T signal generator 20 are graphically illustrated. The N pulses used in the TD signal generator 29 are also shown. It will be noted that the C pulses are square-wave pulses having a fifty percent duty cycle. To be consistent with the voltage requirements of the computer and the signal generators, the magnitudes of the C pulses vary between minus ten volts and plus five volts. It should further be noted that the different clock-pulse signals are one-quarter of a pulse period out of phase.

Figure 4:
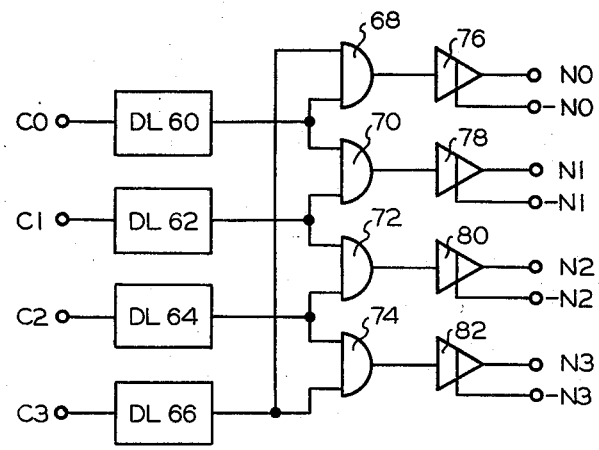
Fig. 4 illustrates in block symbol form apparatus for generating some of the signals used in the apparatus shown in Fig. 2.

Referring now to the N signal generator 58 shown in Fig. 4, the source of the N pulses utilized in the TD signal generator 29 is shown in logical detail.

N pulse generator 58 comprises delay lines 60, 62, 64 and 66, gates 68, 70, 72 and 74, and pulse amplifiers 76, 78, 80 and 82. The delay lines 60, 62, 64 and 66 provide a delay of one-eighth of a pulse period. C0 is fed via delay line 60 to gates 68 and 70. C1 is fed via delay line 62 to gates 70 and 72. C2 is fed via delay line 64 to gates 72 and 74. C3 is fed via delay line 66 to gates 68 and 74.

Pulse amplifiers 76, 78, 80 and 82 are shown as having positive and negative output terminals indicated as N$n$ and —N$n$ respectively. A positive pulse received via an input terminal of any of the pulse amplifiers 76, 78, 80 and 82 is passed directly to the positive output terminal N$n$ in a manner as previously indicated. More particularly, the presence of a pulse is indicated at a positive output terminal N$n$ by plus five volts and the absence of a pulse is indicated by minus ten volts. The negative output terminals —N$n$ of pulse amplifiers 76, 78, 80 and 82 produce potentials which are opposite to that of the associated positive output terminals.

Referring now to the time chart in Fig. 3, it is noted that the C pulses overlap for one-quarter of a pulse period. Thus the gates 68, 70, 72 and 74 pass positive signals for only one-quarter of a pulse period. For example, the gate 68 which receives C0 and C3 from the delay line 60 and 66, respectively, passes a positive signal having a one-quarter of a pulse period duration which corresponds to the overlapping periods of C0 and C3. Additionally, by operation of the delay line 60, the overlapping period is delayed for one-eighth of a pulse time. Thus, N0 is a signal consisting of pulses which have one-quarter of a pulse period duration and are delayed one-eighth of a pulse period from the corresponding overlap of C0 and C3 as shown in Fig. 3. —N0 is similar to N0 except that —N0 is of opposite polarity.

The remaining N$n$ and —N$n$ signals are generated in a similar fashion and are illustrated in detail in the time chart of Fig. 3. The N$n$ and —N$n$ signals are utilized in the TD signal generator 29 of Fig. 2.

Figure 5:
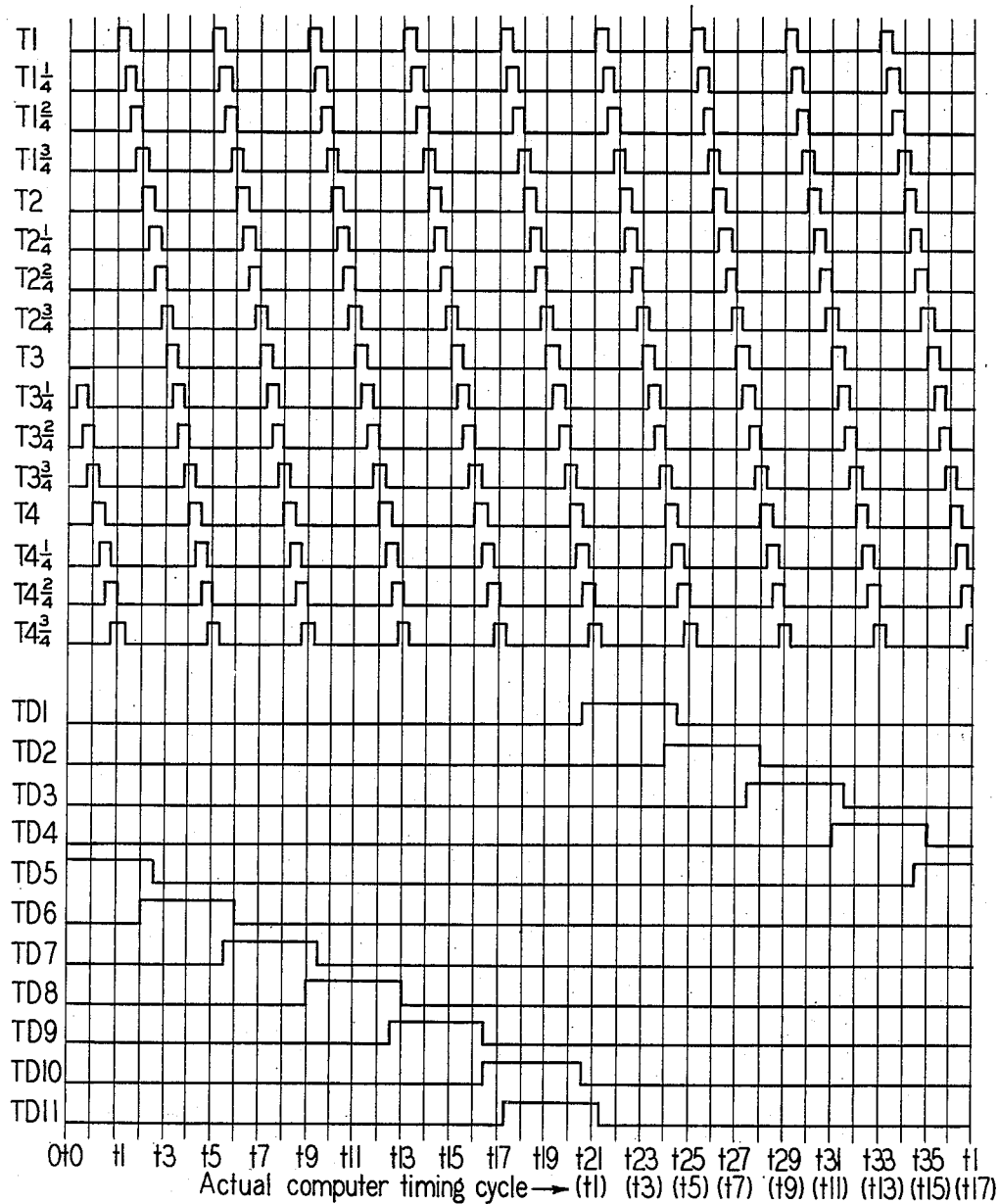
Fig. 5 is a time chart of the signals generated by the circuits of Figs. 1 and 2.

Referring now to the time chart of Fig. 5, the various signals produced by the T signal generator 20 and the TD signal generator 29 are illustrated in idealized form. Each signal is designated T$n$ or TD$n$ and corresponds to an output terminal of the T signal generator 20 or the TD signal generator 29. The abscissa of the graph is measured in time periods which are designated $tn$. Thus $t1$–$t36$ denote a period of time corresponding to a basic timing cycle. In the computer, the beginning of the timing cycle actually corresponds to $t21$ and is designated ($t1$) on the chart. Since $t1$–$t36$ occur cyclically, ($t19$) of the computer cycle would correspond to $t3$ of the second cycle. The time chart will next be used to illustrate the operation of the T signal generator 20 and the TD signal generator 29.

Signal OTO is a cyclically occurring positive pulse which is supplied in a manner indicated in assignee's above noted Patent 2,756,329 to Lubkin. The occurrence of OTO initiates (after some delay) a basic timing cycle and the time which elapses between the occurrence of successive OTO pulses corresponds to the time length of a basic timing cycle.

To initiate operation of the T signal generator 20, a positive signal AG is fed to an input terminal of the gate 24 and thus the gate 24 passes a series of positive pulses to reshaper 26$a$.

At the same time, a negative signal is fed via the differentiating network 28 to the reset terminal of reshaper 26$a$. The leading edge of the negative signal is differentiated and operates via the reset terminal of reshaper 26$a$ to block reshaper 26$a$ and clear the T signal generator 20 of pulses which have been previously circulating. Because of differentiating network 28, only the leading edge of signal —AG is operative and therefore positive signal AG is effective at gate 24 for a longer time and gate 24 passes an OTO pulse which is not blocked by —AG. It should be noted that in the absence of T$n$ pulses, the TD signal generator 29 does not generate TD pulses.

OTO is fed to reshaper 26$a$. Reshaper 26$a$ receives C1 via timing terminal C1 and functions to reshape and retime OTO. A positive pulse having a fifty percent duty cycle is produced at positive output terminal T3-1/4. Simultaneously, a negative pulse is produced at negative output terminal —T3-1/4.

The positive pulse transmitted by the positive output terminal T3-1/4 is fed to the input terminal of the reshaper 26$b$ which receives C2 via timing terminal C2. Since C2 is initiated one-quarter of a pulse period after the receipt of an input pulse by reshaper 26$b$, an output pulse is initiated one-quarter of a pulse period following the receipt of an input pulse by reshaper 26$b$. Simultaneously a negative pulse is produced at negative terminal —T3-2/4.

In this fashion, successive output pulses are produced by successive reshapers 26. Each clock pulse is fed to its respective reshaper in order to aid in producing an output pulse which is delayed one-quarter of a pulse period. Thus a series of pulses are produced at the output terminals T$n$ and —T$n$ which are out of phase by one-quarter of a pulse period.

It will be noted that the total delay encountered by a pulse circulating in the T signal generator 20 is four pulse periods. Thus each of the output terminals T$n$ and —T$n$ produces a pulse every four pulse periods as indicated by the time chart of Fig. 5.

Reshaper 26$h$ has been chosen to produce T1. Any of the other reshapers 26 might likewise be chosen to produce T1 and initiate the order in which the T$n$'s are generated.

Each output terminal T$n$ and —T$n$ produces an output pulse once every four pulse periods, and produces a total of nine output pulses during each basic timing cycle. This result is achieved because the T signal generator 20 is a recirculation loop comprising a four pulse-period delay. It should be noted that the recirculation loop does not require the use of expensive delay lines with which to perform its storing and recirculating functions.

The T pulses are not only transmitted to the computer but are also transmitted to the TD signal generator 29 and are used as next described.

When OTO is transmitted to the T signal generator 20, it is simultaneously transmitted to the TD signal generator 29 to excite the pulse extender 32$a$ which therefore produces a positive output signal at its output terminal TD5. The output signal at TD5 remains positive until the T signal generator 20 produces a negative signal at —T2-2/4 and —N2 becomes negative. Since —N2 becomes negative during the second quarter of a pulse period, the coincidence of —T2-2/4 and —N2 as negative signals permits the buffer 34$a$ to pass a negative signal. The resultant negative pulse from the buffer 34$a$ is narrow (i.e. one-quarter of a pulse period) due to the effect of −N2. The passing of a negative signal by buffer 34a causes the termination of the positive output signal TD5 at substantially t2-2/4. It should, however, be noted that the use of −N2 as a terminating pulse delays the termination for one-eighth of a pulse period.

The positive output signal generated by pulse extender 32a is fed to the gate 30b which also receives T2. T2 is generated by T signal generator 20 preceding the occurrence of −T2-2/4 which resets pulse extender 32a. Therefore, all input signals received by gate 30b are positive when T2 becomes positive. As a result, pulse extender 32b is excited at t2 and produces a positive output signal at TD6.

In a manner as described for buffer 34a, the buffer 34b passes a negative signal when the signals at −T2 and −N0 are coincidentally negative. Thus, pulse extender 32b terminates its production of the positive output signal at substantially t2 except as modified by the use of −N0 at the buffer 34b.

It has thus been illustrated how signals TD5 and TD6 are generated. Each of the succeeding pulse extenders 32c–32j similarly produce output pulses with the exception of pulse extenders 32f and 32g. Pulse extenders 32f and 32g receive input signals via delay lines 36 and 38 as previously explained. Thus the output signals of pulse extenders 32f and 32g are delayed in accordance with the delays of delay lines 36 and 38. This provides for the particular requirements of the computer for which the invention is being explained. Additionally, the output signal of pulse extender 32f is delayed to cause TD10 and TD11 to overlap for purposes of error checking as described and claimed in the copending application of Morse Minkow, Serial No. 478,470, filed December 29, 1954, now abandoned, and assigned to the same assignee.

It will next be shown that the narrow pulses Nn aid in permitting the pulse extenders 32 to be "set dominant." It is seen that output pulses are both initiated and terminated by the same Tn pulse. Therefore in order to enable the pulse extenders 32 to initiate an output pulse upon the receipt of Tn without interference by −Tn, −Nn is fed to each of the pulse extenders 32 with the −Tn pulse. This allows the Tn pulse to be effective before the −Tn pulse and insures that the pulse extender 32 is excited. When, however, the output pulse of a pulse extender 32 is to be terminated, the −Tn pulse is effective because the Tn pulse is blocked at its associated gate.

Figure 6:
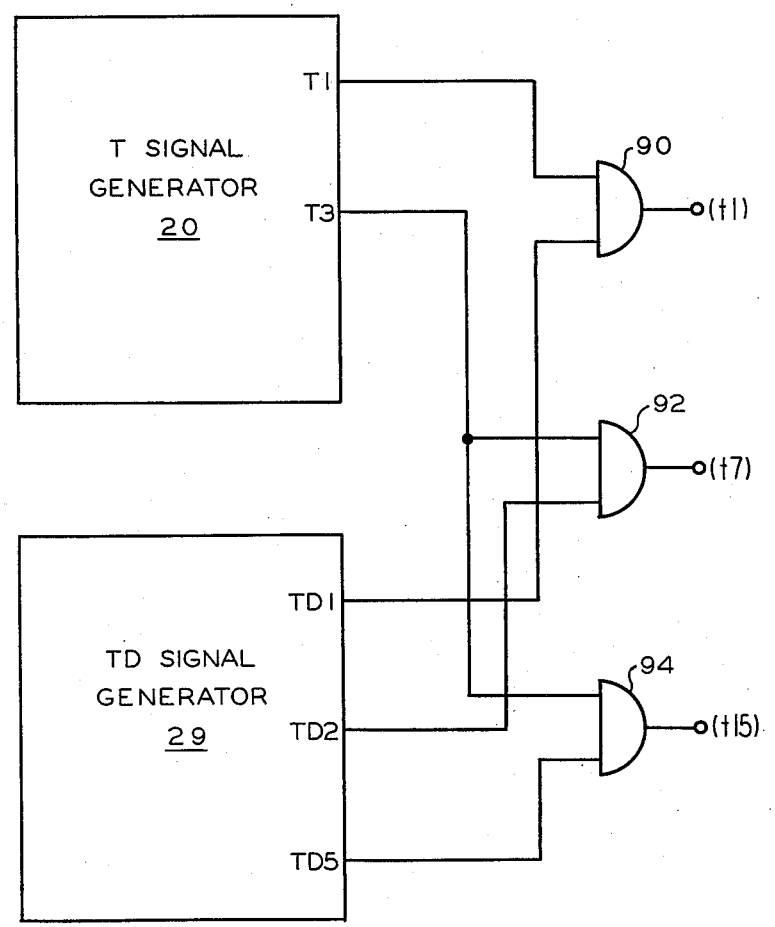
Fig. 6 illustrates circuits for combining signals generated by the apparatus of Figs. 1 and 2.

Referring now to the apparatus shown in Fig. 6, it will next be shown how the Tn and TDn signals are combined to provide pulses which occur at particular times during a timing cycle. In the example, it will be assumed that timing pulses must be provided to select bits (of characters) which occur at t1, t7 and t15 of the computer timing cycle.

The apparatus includes the gates 90, 92 and 94. Input terminals of the gate 90 are coupled to terminals T1 and TD1. Input terminals of the gate 92 are coupled to terminals T3 and TD2. Input terminals of the gate 94 are coupled to terminals T3 and TD5.

Reference to the timing chart of Fig. 5 shows that the input terminals of gate 90 are coincidentally at positive potentials only at t1 of the computer timing cycle. Thus a positive pulse is passed by gate 90 at t1 of each computer timing cycle.

Similarly, the gates 92 and 94 respectively pass positive pulses at t7 and t15 of the computer timing cycle. It is thus possible to combine the Tn and TDn pulses to obtain pulses which correspond to selected pulse periods in timing cycles.

It should be noted that the combining of the Tn and TDn pulses enable the generation of pulses corresponding to each of the pulse periods of the timing cycle. Further, even though the number of sources of Tn and TDn pulses is less than the number of pulse periods in a timing cycle, pulses can be supplied corresponding to each quarter of a pulse period of the timing cycle.

It has thus been shown how pulses are generated to correspond to each pulse period of a basic timing cycle and to each one-quarter of a pulse period of a basic timing cycle. It has additionally been shown how the pulses which correspond to pulse periods are utilized in a signal generator to generate other signals which correspond to predetermined sequences of pulse periods. It should be noted that the generators are sources of precisely timed signals which can be used for selecting the representations of characters or to select particular binary digits from units of information being processed in a computer. The principles of the invention can, however, be utilized to generate signals which have less severe timing requirements.

It should be further noted that circuits disclosed in accordance with the invention supply a convenient and reliable means for switching predetermined portions of information and that expensive delay lines are not required for constructing such circuits. It will be seen in the following description of the symbols that the output signals (Tn and TDn) are supplied directly by pulse amplifiers and are therefore sources of considerable power.

A description of the symbols which have been used to logically illustrate the circuits follows:

Description of symbols

The symbols and the schematic equivalents of the symbols which have been employed to simplify the detailed description of the signal generators are shown in Figs. 7 through 18. For convenient reference, all positive and negative supply buses will generally be identified by a number corresponding with their voltage. The circuit terminals which correspond to symbol terminals are identified by the use of the same character reference numbers.

Gate

The gates used in the apparatus are of the "coincidence" type, each comprising a crystal diode network which functions to receive input signals via a plurality of input terminals and to pass the most negative signal.

Figure 7:
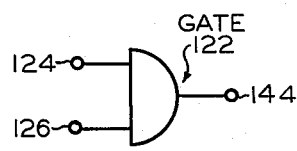
Fig. 7 illustrates the logical symbol for a gate.

The symbol for a representative gate 122, having two input terminals 124 and 126, is shown in Fig. 7. Since the signal potential levels are plus five volts (positive signals) and minus ten volts (negative signals), the potentials of the signals which may exist at the input terminals 124 and 126 are thereby limited.

If a potential of minus ten volts is present at one or both of the input terminals 124 and 126, a potential of minus ten volts exists at the output terminal 144. Therefore, if one of the input signals to the input terminals 124 and 126 is positive and the other signal is negative, the negative signal is passed and the positive signal is "blocked."

When there is a coincidence of positive signals at the two input terminals 124 and 126, a positive signal is transmitted from the output terminal 144. In such case, it may be stated that a positive signal is "gated" or "passed" by the gate 122.

Figure 8:
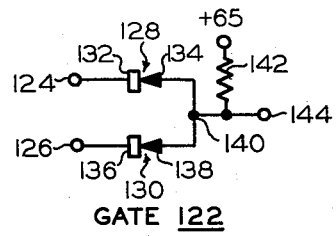
Fig. 8 shows a schematic diagram of the circuit represented by the symbol of Fig. 7.

The schematic details of the gate 122 are shown in Fig. 8. Gate 122 includes the crystal diodes 128 and 130. Each of the input terminals 124 and 126 is coupled to one of the crystal diodes 128 and 130. Crystal diode 128 comprises the cathode 132 and the anode 134. Crystal diode 130 comprises the anode 138 and the cathode 136. More particularly, the input terminals 124 and 126 are respectively coupled to the cathode 132 of the crystal diode 128 and the cathode 136 of the crystal diode 130. The anode 134 of the crystal diode 128 and the anode 138 of the crystal diode 130 are interconnected at the junction 140. The anodes 134 and 138 are coupled via the resistor 142 to the positive voltage bus 65.

If negative potentials are simultaneously present at the input terminals 124 and 126, both of the crystal diodes 128 and 130 conduct, since the positive supply bus 65 tends to make the anodes 134 and 138 more positive. The voltage at the junction 140 will then be minus ten volts since, while conducting, the anodes 134 and 138 of the crystal diodes 128 and 130 assume the potential of the associated cathodes 132 and 136.

When a positive signal is fed only to the input terminal 124, the cathode 132 is raised to a positive five volts potential and is made more positive than the anode 134, so that crystal diode 128 stops conducting. As a result, the potential at the junction 140 remains at the negative ten volts level. In a similar manner, when a positive signal is only present at the input terminal 126, the voltage at the junction 140 will not be changed.

When the signals present at both input terminals 124 and 126 are positve, the anodes 134 and 138 are raised to approximately the same potential as their associated cathodes 132 and 136 and the potential at the junction 140 rises to a positive potential of five volts.

The potential which exists at the junction 140 is transmitted from the gate 122 via the connected output terminal 144.

In the above described manner, the gate 122 is frequently used as a switch to govern the passage of one signal by the presence of one or more signals which control the operation of the gate 122.

It should be understood that the potentials of plus five volts and minus ten volts used for purpose of illustration are approximate, and the exact potentials will be affected in two ways. First, they will be affected by the value of the resistance 142 and its relation to the impedances of the input circuits connected to the input terminals 124 and 126. Second, they will be affected by the fact that a crystal diode has some resistance (i.e., is not a perfect conductor) when its anode is more positive than its cathode, and furthermore will pass some current (i.e., does not have infinite resistance) when its anode is more negative than its cathode. Nevertheless, the assumption that signal potentials are either plus five or minus ten volts is sufficiently accurate to serve as a basis for the description of the operations taking place in the apparatus.

A clamping diode may be connected to the output terminal 144 to prevent the terminal from becoming more negative than a predetermined voltage level to protect the diodes 128 and 130 against excessive back voltages and to provide the proper voltage levels for succeeding circuits.

Buffer

The buffers used in the comparators are also known as "or" gates. Each buffer comprises a crystal diode network which functions to receive input signals via a plurality of input terminals and to pass the most positive signal.

Figure 9:
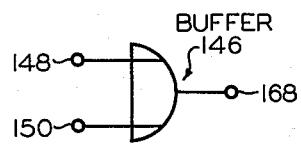
Fig. 9 illustrates the logical symbol for a buffer.

The symbol for a representative buffer 146, having two input terminals 148 and 150, is shown in Fig. 9. Since the signal potential levels in the system are minus ten volts and plus five volts, either one of these potentials may exist at the input terminals 148 and 150.

If a positive potential of five volts exists at one or both of the input terminals 148 or 150, a positive potential of five volts exists at the output terminal 168. If a negative potential of ten volts is present at both of the input terminals 148 and 150, a negative potential of ten volts will be present at the output terminal 168.

Figure 10:
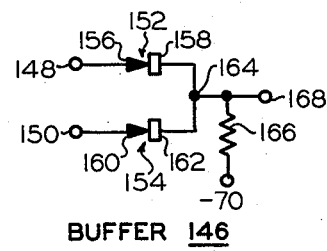
Fig. 10 shows a schematic diagram of the circuit represented by the symbol of Fig. 9.

The schematic details of the buffer 146 are shown in Fig. 10. The buffer 146 includes the two crystal diodes 152 and 154. The crystal diode 152 comprises the anode 156 and the cathode 158. Crystal diode 154 comprises the anode 160 and the cathode 162. The anode 156 of the crystal diode 152 is coupled to the input terminal 148. The anode 160 of the crystal diode 154 is coupled to the input terminal 150. The cathodes 158 and 162 of the crystal diodes 152 and 154, respectively, are joined at the junction 164 which is coupled to the output terminal 168, and via the resistor 166 to the negative supply bus 70. The negative supply bus 70 tends to make the cathodes 158 and 162 more negative than the anodes 156 and 160, respectively, causing both crystal diodes 152 and 154 to conduct.

When negative ten volt signals are simultaneously present at input terminals 148 and 150, the crystal diodes 152 and 154 are conductive, and the potential at the cathodes 158 and 162 approaches the magnitude of potential at the anodes 156 and 160. As a result, a negative potential of ten volts appears at the output terminal 168.

If the potential at one of the input terminals 148 or 150 increases to plus five volts, the potential at the junction 164 approaches the positive five volts level as this voltage is passed through the conducting crystal diode 152 or 154 to which the voltage is applied. The other crystal diode 152 or 154 stops conducting since its anode 156 or 160 becomes more negative than the junction 164. As a result, a positive potential of five volts appears at the output terminal 168.

If positive five volt signals are fed simultaneously to both input terminals 148 and 150, a positive potential of five volts appears at the output terminal 168, since both crystal diodes 152 and 154 will remain conducting. Thus the buffer 146 functions to pass the most positive signal received via the input terminals 148 and 150.

Pulse amplifier

Figure 11:
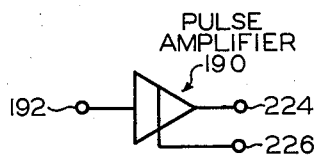
Fig. 11 illustrates the logical symbol for a pulse amplifier.

The symbol for a representative pulse amplifier is shown in Fig. 11. When a positive pulse is fed to the pulse amplifier 190 via the input terminal 192, the pulse amplifier 190 functions to transmit a positive pulse which swings from minus ten to plus five volts from its positive output terminal 224, and a negative pulse which swings from plus five to minus ten volts from its negative output terminal 226. At all other times, the pulse amplifier 190 has a negative potential of ten volts at its positive output terminal 224 and a positive potential of five volts at its negative output terminal 226.

Figure 12:
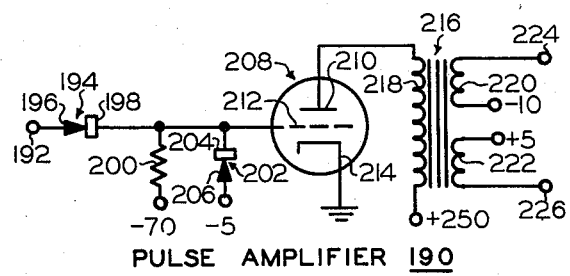
Fig. 12 shows a schematic diagram of the circuit represented by the symbol of Fig. 11.

The detailed circuitry of the pulse amplifier 190 is shown in Fig. 12. The pulse amplifier 190 includes the vacuum tube 208, the pulse transformer 216 and associated circuitry. The vacuum tube 208 comprises the cathode 214, the grid 212 and the anode 210. The pulse transformer comprises the primary winding 218 and the secondary windings 220 and 222.

The crystal diode 194 couples the grid 212 of the vacuum tube 208 to the input terminal 192, the anode 196 of the crystal diode 194 being coupled to the input terminal 192, and the cathode 198 being coupled to the grid 212. The negative supply bus 70 is coupled to the grid 212 via the resistor 200 and tends to make the crystal diode 194 conductive. The grid 212 and the cathode 198 of the crystal diode 194 are also coupled to the cathode 204 of the crystal diode 202, whose anode 206 is coupled to the negative supply bus 5. The crystal diode 202 clamps the grid 212 at a potential of minus five volts thus preventing the voltage applied to the grid 212 from becoming more negative than minus five volts.

When a voltage more positive than minus five volts is transmitted to the input terminal 192, the crystal diode 194 conducts and the voltage is applied to the grid 212. Since the crystal diode 202 clamps the grid 212 and the cathode 198 of the crystal diode 194 at minus five volts, any voltage more negative than minus five volts will cause the crystal diode 194 to become nonconductive, and that input voltage will be blocked at the crystal diode 194. Thus, the clamping action of the crystal diode 202 will not affect the circuitry which supplies the input voltage.

The cathode 214 of the vaccum tube 208 is connected to ground potential. The anode 210 of the vacuum tube 208 is coupled by the primary winding 218 of the pulse transformer 216 to the positive supply bus 250. The outer ends of the secondary windings 220 and 222 of the pulse transformer 216 are coupled respectively to the positive output terminal 224 and the negative output terminal 226. The inner ends of the secondary windings 220 and 222 are coupled respectively to the negative supply bus 10 and the positive supply bus 5.

A positive pulse which is fed to the grid 212 of the vacuum tube 208 will be inverted at the primary winding 218 of the pulse transformer 216 which is wound to produce a positive pulse in the secondary winding 220 and a negative pulse in the secondary winding 222. These pulses respectively drive the positive output terminal 224 up to a positive five volts potential and the negative output terminal 226 down to a negative ten volts potential because of the circuit parameters.

When the vacuum tube 208 is non-conducting, the negative ten volts potential is fed through the secondary winding 220 and appears at the positive output terminal 224. At the same time, the positive five volts potential is fed through the secondary winding 222 to the negative output terminal 226. These latter conditions are the normally existing conditions at the output terminals 224 and 226.

Reshaper

A reshaper is an electronic circuit which functions to reshape and retime positive pulses which are received.

Figure 13:
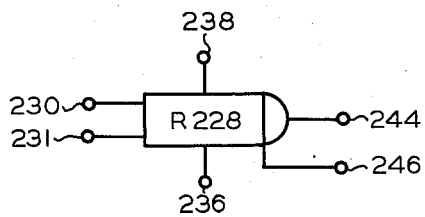
Fig. 13 illustrates the logical symbol for a reshaper.

The symbol for a representative reshaper 228 is illustrated in Fig. 13 and comprises one or more input terminals of which the input terminals 230 and 231 are shown, timing terminal 238 which receives reshaping and retiming pulses (also designated clocking or C pulses), positive output terminal 244, negative output terminal 246, and blocking terminal 236 through which signals may be sent to make the reshaper 228 inoperative.

Except when positive pulses are fed to the input terminals 230 and 231 of the reshaper 228, a negative potential of ten volts is present at the positive output terminal 244 and a positive potential of five volts exists at the negative output terminal 246.

When a pulse is fed to the reshaper 228 via one or both of the input terminals 230 and 231, the pulse is reshaped by a clock pulse (received via the terminal 238) which is timed to delay the reshaped pulse for one-quarter of a pulse time, and is then transmitted from the reshaper 228 via the positive output terminal 244. While the positive pulse is being transmitted from the positive output terminal 244, a negative pulse is transmitted from the negative output terminal 246.

Figure 14:
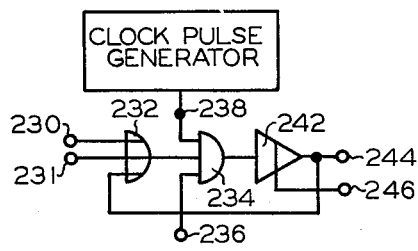
Fig. 14 is a logical diagram of the circuit represented by the symbol of Fig. 13.

The detailed circuitry of the reshaper 228 is illustrated in Fig. 14 in which use is made of logical symbols previously described.

The reshaper 228 comprises the buffer 232, the gate 234 and the pulse amplifier 242 connected in series. A positive pulse which is fed via one or both of the input terminals 230 and 231 of the buffer 232 is passed to the gate 234. Signals may also be fed via the blocking terminal 236 to the gate 234 and if the signal is negative, the gate 234 is blocked and the reshaper 228 is inoperative. The blocking terminal 236 is generally absent and if present usually receives a positive signal.

A series of identical clock pulses which are generated in the clock pulse generator are transmitted to the gate 234 via the timing terminal 238. The clock pulses are equal in magnitude and width to the desired shape and timing for the pulses which are to be reshaped and retimed. The clock pulses are timed so that the starting time of each clock pulse coincides approximately with the center of the pulse it is intended to reshape and delay.

When the input pulse reaches its full magnitude at the gate 234, the coinciding clock pulse is gated through to the amplifier 242 and is amplified and causes a positive pulse to be transmitted from the positive output terminal 244, and a negative pulse to be transmitted from the negative output terminal 246. Hence the leading edge of the input pulse after passing through the reshaper will be one-quarter pulse time later, and on this basis it may be said that a reshaper introduces a one-quarter pulse time delay in the signals passing through it.

The positive output terminal 244 is also coupled to one input of the buffer 232 so that a positive signal which appears at the positive output terminal 244 is regenerative and will continue to exist until the clock pulse terminates at the gate 234. This effectively permits the entire clock pulse to be gated through the gate 234, even though the original pulse has decayed before the end of the clock pulse.

Stated more generally, a clock pulse is passed through the gate 234 from the earliest coincidence of the clock pulse and the input pulse until the termination of the clock pulse. As a result, an output pulse is produced after a delay of one-quarter of a pulse time.

Delay line

The symbol for a representative electrical delay line 71 which is a lumped parameter type delay line and which functions to delay received pulses for discrete periods of time, is shown in Fig. 15.

The delay line 71 comprises the input terminal 72, the output terminal 88, and a plurality of taps 80, 82 and 84. A pulse which is fed via the input terminal 72 to the delay line 71 will be delayed for an increasing number of pulse times before successively appearing at the taps 80, 82 and 84. When the pulse reaches the output terminal 88, the total delay provided by the delay line 71 has been applied. In the text, the specific number of pulse-times delay which is encountered before a pulse travels from the input terminal to a tap of the delay line is stated.

The delay line 71 shown in Fig. 15 comprises a plurality of inductors 76 connected in series, with the associated capacitors 78 which couple a point 74 on each inductor 76 to ground. A signal is fed into the delay line 71 at the input terminal 72 and the maximum delay occurs at the output terminal 88. The taps 80, 82 and 84 are each connected to one of the points 74 and provide varied delays. The delay line 71 is terminated by a resistor 86 in order to prevent reflections. Although in the delay line of Fig. 15 a tap is shown connected to each of the points 74, it should be understood that in actual practice there are ordinarily several untapped points 74 between successive taps.

Pulse extender

A pulse extender is an electronic circuit which functions to respond to an input pulse by producing an output pulse of longer duration than the input pulse.

The symbol for a representative pulse extender 250 is illustrated in Fig. 17 and comprises one or more input terminals of which the input terminals 252 and 254 are shown. The pulse extender 250 also includes positive output terminal 256, negative output terminal 258 and reset terminal 260.

When the pulse extender 250 is not responding to an input pulse and is in its normal state, minus ten volts is present at the positive output terminal 256 and plus five volts is present at the negative output terminal 258. A plus five volts signal is received at the reset terminal 260.

When a positive pulse is received via either of the input terminals 252 or 254, the pulse extender 250 is excited and the potentials at the positive and negative output terminals 256 and 258 interchange. Plus five volts is transmitted from the positive output terminal 256 and minus ten volts is transmitted from the negative output terminal 258.

The transmission of a positive signal from positive output terminal 256 and a negative signal from negative output terminal 258 continues until a minus ten volts signal is received at the reset terminal 260. At this time, the signals at the positive and negative output terminals 256 and 258 again interchange and the pulse extender 250 reverts to its normal state.

The time which elapses between the receipt of a positive input pulse at input terminal 252 or 254 and of a negative signal at reset terminal 260 is such that the positive potential (or output pulse) transmitted from positive output terminal 256 is of longer duration than the input pulse. Similarly, the negative output pulse transmitted from negative output terminal 258 is of longer duration than the input pulse.

It should be noted that an input pulse dominates a negative signal at the reset terminal 260 so that when such signals coincidentally occur, the pulse extender 250 is excited. However, should the negative signal at the reset terminal 260 last longer than the input pulse, the pulse extender 250 reverts to its normal state.

The detailed circuitry of the pulse extender 250 is illustrated in Fig. 18 and comprises a buffer 262, a pulse amplifier 264 and a gate 266.

The input terminals 252 and 254 are input terminals of the buffer 262. Thus, when a positive pulse is received at either of input terminals 252 or 254, a positive pulse is transmitted to pulse amplifier 264.

Normally, minus ten volts is present at positive output terminal 256 and plus five volts is present at negative output terminal 258. However, when a positive pulse is received by the pulse amplifier 264, the voltages interchange and a positive signal is transmitted from positive output terminal 256.

When a positive signal is present at reset terminal 260, the positive signal at positive output terminal 256 is fed back to buffer 262 via gate 266 thereby maintaining a substantially constant positive output signal at positive output terminal 256. When the signal at reset terminal 260 becomes negative, the gate 266 is blocked and feedback from positive output terminal 256 to buffer 262 is stopped. The signals at positive and negative output terminals again interchange and pulse extender 250 reverts to its normal state.

Thus pulses are produced at positive and negative output terminals 256 and 258 in accordance with the exciting of the pulse extender 250 by pulses received at input terminals 252 and 254 and with the blocking of gate 266 by a negative signal at reset terminal 260.

There will now be obvious to those skilled in the art many modifications and variations utilizing the principles set forth and realizing many or all of the objects and advantages of the circuits described but which do not depart essentially from the spirit of the invention.

What is claimed is:

1. A timing signal generator to produce a signal pulse at a predetermined time in a cycle of a cycling device, said generator comprising a source of clock pulses, a plurality of serially connected settable devices connected in a regenerative loop circuit, each settable device being controlled by one of said clock pulses and an input pulse to produce an output pulse after a fixed delay, means to introduce an initial pulse into said loop, a second loop of serially connected settable devices controlled by said output pulses and by said input pulse to produce a plurality of output signals having an over-all time duration equal to the time length of a cycle, and a plurality of gating means, each controlled by a signal from said first loop and a signal from said second loop to produce a timing signal at a predetermined time in said cycle.

2. A timing signal generator to produce a signal pulse at a predetermined time in a cycle of a cycling device, said generator comprising a source of clock pulses, a recirculation loop of serially connected settable devices, each settable device being prepared by an input pulse and activated by a clock pulse to produce an output pulse at a fixed time interval after receipt of an input pulse, a second input means connected to one of said settable devices to introduce an initial pulse into said loop whereby each settable device will produce a series of output pulses at time intervals equal to the recirculation time of said loop, a second recirculation loop of serially connected settable flip-flops, each settable flip-flop being alerted by an input pulse, set by a pulse from a settable device of said first loop and reset by the succeeding pulse from said same settable device, means connected to one of said settable flip-flops to introduce an initial pulse into said second loop whereby each flip-flop produces a series of output pulses having a length equal to the recirculation time of said first loop, the recirculation time of said second loop being equal to the length of said cycle, and gating means controlled by an output pulse from said first loop and an output pulse from said second loop to produce a timing pulse at a preselected time in said cycle.

3. A timing signal generator for producing a timing signal at a selected time in a cycle of operation of a device, said generator comprising a source of clock pulses, a first pulse recirculation loop controlled by said clock pulses to produce a plurality of sequential output pulses during each recirculation cycle and having a recirculation frequency which is an integral multiple of the cyclic frequency of said device, a second recirculation loop having a recirculation time equal to the time length of said cycle and controlled by said clock pulses and said output pulses of said first loop to generate a plurality of sequential output pulses, each of said sequential output pulses having a pulse length equal to the recirculation time of said first loop with at least one pulse being present at each interval of said cycle, a cyclically operating source to introduce a synchronized starting pulse into each loop, and gating means controlled by an output pulse from each of said recirculation loops to pass timing signals.

4. A timing signal generator for producing signals at a predetermined time in a timing cycle which consists of a given number of data periods of a fixed number of pulse periods each, said timing signal generator comprising a clock pulse generator producing a plurality of sequential pulses during each pulse period, a first closed recirculation loop of serially connected pulse producers having a total recirculation period equal to the length of a data period, each said pulse producer being controlled by one of said clock pulses and an output pulse from the adjacent prior pulse producer to generate a pulse at a fixed time delay after application thereto of said output pulse, a second closed recirculation loop of serially connected settable devices having a total recirculation period equal to the length of a cycle, each said settable device being set by an output pulse from said first recirculation loop in combination with a voltage from the prior adjacent settable device when set and being reset by the same output pulse when no voltage is present whereby each settable device has a voltage output for the duration of one data period, a synchronizing device to insert a starting signal into each circulation loop at the beginning of each timing cycle, and gating devices controlled jointly by an output pulse from a pulse producer of said first recirculation loop and a voltage from a settable device of said second recirculation loop to pass a timing signal at a preselected pulse period.

References Cited in the file of this patent

UNITED STATES PATENTS

| | | |
|---|---|---|
| 2,140,350 | Dawson | Dec. 13, 1938 |
| 2,282,182 | Gulliksen | May 5, 1942 |
| 2,503,127 | Muma | Apr. 4, 1950 |
| 2,514,036 | Dickinson | Apr. 4, 1950 |
| 2,543,874 | Shenk | Mar. 6, 1951 |
| 2,577,141 | Mauchly | Dec. 4, 1951 |